US009827500B1

(12) United States Patent
Baklov et al.

(10) Patent No.: US 9,827,500 B1
(45) Date of Patent: Nov. 28, 2017

(54) ASSOCIATED CONTENT ITEM INSTANCES

(71) Applicant: Amazon Technologies, Inc., Seattle, WA (US)

(72) Inventors: Rosen Ognyanov Baklov, Lake Forest, CA (US); Nicholas Joshua Lawson, Irvine, CA (US); Patrick Gilmore, Agoura Hills, CA (US); Michael Donges, Trabuco Canyon, CA (US); Joseph Conlin Connors, Redmond, WA (US); Eric Schenk, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 332 days.

(21) Appl. No.: 14/579,135

(22) Filed: Dec. 22, 2014

(51) Int. Cl.
*A63F 13/86* (2014.01)

(52) U.S. Cl.
CPC .................... *A63F 13/86* (2014.09)

(58) Field of Classification Search
USPC .......................................................... 463/31
See application file for complete search history.

(56) References Cited

U.S. PATENT DOCUMENTS

| 6,269,394 | B1 | 7/2001 | Kenner et al. |
| 8,654,684 | B1 | 2/2014 | Pai et al. |
| 9,308,452 | B2 * | 4/2016 | Perlman ................. A63F 13/12 |
| 2010/0167809 | A1 * | 7/2010 | Perlman ................. A63F 13/12 463/24 |
| 2013/0170492 | A1 | 7/2013 | Lu et al. |
| 2013/0268357 | A1 | 10/2013 | Heath |
| 2013/0343450 | A1 | 12/2013 | Solka et al. |

* cited by examiner

*Primary Examiner* — Pierre E Elisca
(74) *Attorney, Agent, or Firm* — Baker & Hostetler LLP

(57) ABSTRACT

A first content item instance may be played by one or more participants and may be presented by one or more first compute nodes to the one or more participants. Information associated with the first content item instance may be collected. The information may include, for example, game state, user inputs, and other information associated with the first content item instance. The information may be provided as input to a second content item instance executing at one or more second compute nodes. Audio and/or video information output by the second content item instance may then be collected, and data including the collected information may be transmitted to one or more third compute nodes for presentation to spectators. Spectator feedback may be received and provided back to the first content item instance, which may be presented based, at least in part, on the spectator feedback.

22 Claims, 9 Drawing Sheets

FIG. 4

Spectator Presentation Control Interface 401

| Play 431 | Adjust Play Speed 435 | Adjust Camera Perspective 436 | Adjust Zoom 437 | Add Audio Commentary 438 | Add Visual Overlays 439 |
| Pause 432 | | | | | |
| Stop 433 | | | | | |
| Reverse 434 | | | | | |

Content Display Window 410

ASSOCIATED CONTENT ITEM INSTANCES

CROSS-REFERENCE TO RELATED APPLICATIONS

This application is related to the following application, which is hereby incorporated by reference in its entirety: U.S. patent application Ser. No. 14/579,033 filed Dec. 22, 2014, entitled "SPECTATOR FEEDBACK AND ADAPTATION".

BACKGROUND

As the powers and capabilities of computers continue to expand, the widespread use and popularity of content items, such as video games, also continue to rapidly increase. A content item may sometimes be played by one or more participants and may also be viewed by one or more spectators. The participants may sometimes play the content item on a participant device, which may present the played content item to the participants, capture a video feed corresponding to the played content item, and stream the captured video feed to a service. The service may then make the captured video feed available to spectators. This model has a number of associated drawbacks. For example, the process of streaming the video feed from the participants to the service may require and consume large amounts of network bandwidth. Another example drawback is that output provided to the spectators is a video stream that is linear and frame bound, with very little interactivity other than play and pause. Yet another example drawback is that voice chat from participants is not mixed into the video stream and is provided without, for example, characteristics associated with positions or locations of the participants.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 is a diagram illustrating an example spectator presentation control interface that may be used in accordance with the present disclosure.

DETAILED DESCRIPTION

Techniques for presentation of associated content item instances are disclosed herein. In some cases, a first content item instance may execute at one or more first compute nodes. The first content item instance may be played by one or more participants and may be presented by one or more first compute nodes to the one or more participants. Information associated with the first content item instance may be collected by one or more first compute nodes and transmitted to one or more second compute nodes. The transmitted information may include, for example, game state, user inputs, and other information associated with the first content item instance. A second content item instance may execute at one or more second compute nodes, and the transmitted information associated with the first content item instance may be provided as input to the second content item instance. Audio and/or video information output by the second content item instance may then be collected, and data including the collected information may be transmitted to one or more third compute nodes for presentation at the one or more third compute nodes.

In some cases, participant audio information provided by one or more participants may be captured and transmitted from one or more first compute nodes to one or more second compute nodes. The one or more second compute nodes may then mix or otherwise insert the participant audio information into the data transmitted to one or more third compute nodes. Participant audio information provided by each participant may sometimes be mixed into the transmitted data in accordance with a respective audio effect, such as a particular volume and/or directional effect. Also, in some cases, the second content item instance may be presented at one or more third compute nodes using enhanced presentation effects such as adjustable virtual camera perspective, adjustable virtual camera zoom, reverse, adjustable play speed, audio commentary, visual overlays, and others. Also, in some cases, feedback from spectators at the third compute nodes may be provided back to the first content item instance and also optionally the second content item instance.

Figure 1:
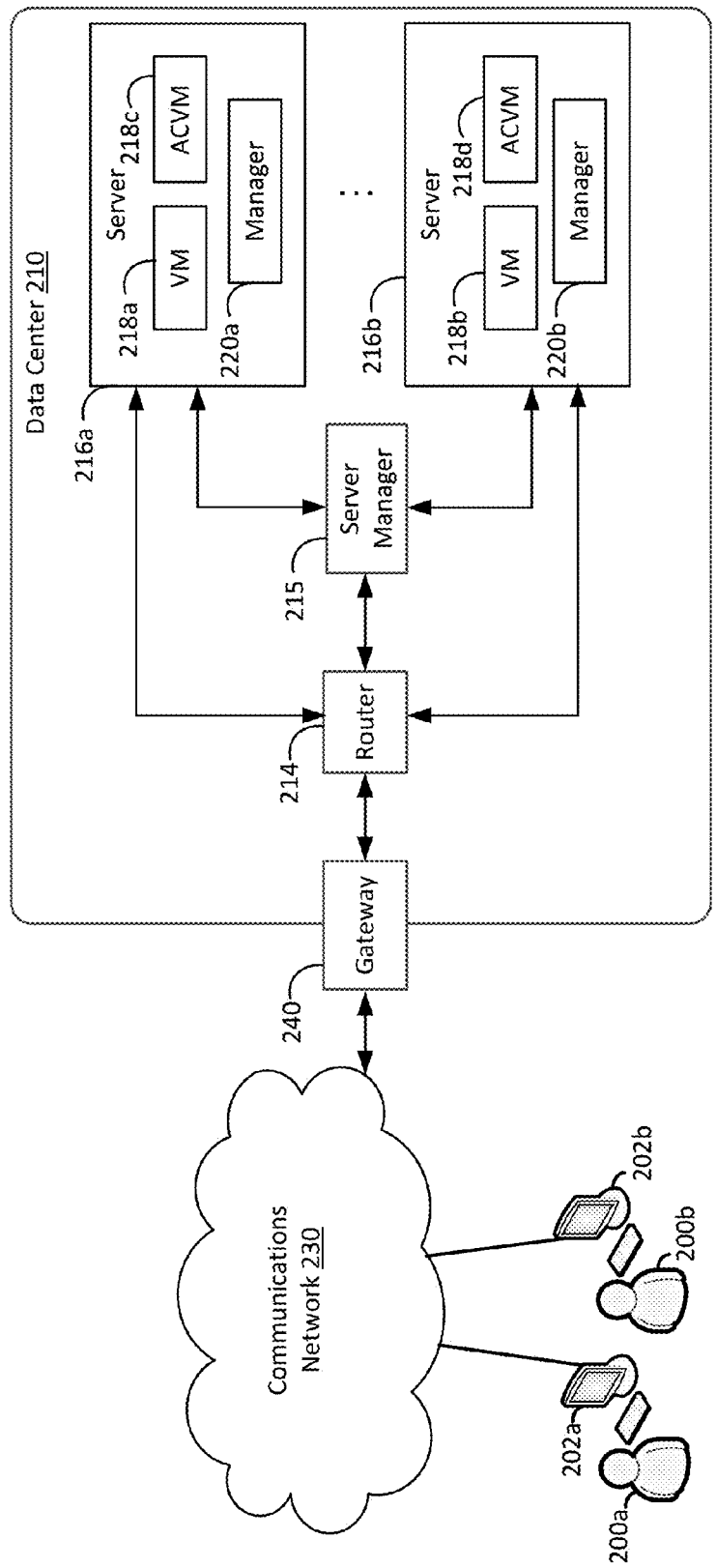
FIG. 1 is a diagram illustrating a first example computing system that may be used in accordance with the present disclosure.

An information provider may, in some cases, transmit information to clients over an electronic network, such as the Internet. An example computing environment that enables transmission of information to clients will now be described in detail. In particular, FIG. 1 illustrates an example computing environment in which the embodiments described herein may be implemented. FIG. 1 is a diagram schematically illustrating an example of a data center 210 that can provide computing resources to users 200a and 200b (which may be referred herein singularly as user 200 or in the plural as users 200) via user computers 202a and 202b (which may be referred herein singularly as computer 202 or in the plural as computers 202) and via a communications network 230. Data center 210 may be configured to provide computing resources for executing applications on a permanent or an as-needed basis. The computing resources provided by data center 210 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications including web services, such as application services, media services, database services, processing services, gateway services, storage services, routing services, security services, encryption services, load balancing services, application services, and the like. These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 210 may include servers 216a and 216b (which may be referred herein singularly as server 216 or in the plural as servers 216) that provide computing resources. These resources may be available as bare metal resources or as virtual machine instances 218a-d (which may be referred herein singularly as virtual machine instance 218 or in the plural as virtual machine instances 218). Virtual machine instances 218c and 218d are associated content virtual machine (ACVM) instances. The ACVM virtual machine instances 218c and 218d may be configured to perform any portion of the associated content item instance presentation techniques and/or any other of the disclosed techniques in accordance with the present disclosure and described in detail below. As should be appreciated, while the particular example illustrated in FIG. 1 includes one ACVM virtual machine in each server, this is merely an example. A server may include more than one ACVM virtual machine or may not include any ACVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 1, communications network 230 may, for example, be a publicly accessible network of linked networks and possibly operated by various distinct parties, such as the Internet. In other embodiments, communications network 230 may be a private network, such as a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box, or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a gateway 240 or web interface (not shown) through which aspects of its operation may be configured through the use of a web browser application program executing on user computer 202. Alternately, a stand-alone application program executing on user computer 202 might access an application programming interface (API) exposed by data center 210 for performing the configuration operations. Other mechanisms for configuring the operation of various web services available at data center 210 might also be utilized.

Servers 216 shown in FIG. 1 may be standard servers configured appropriately for providing the computing resources described above and may provide computing resources for executing one or more web services and/or applications. In one embodiment, the computing resources may be virtual machine instances 218. In the example of virtual machine instances, each of the servers 216 may be configured to execute an instance manager 220a or 220b (which may be referred herein singularly as instance manager 220 or in the plural as instance managers 220) capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 1, a router 214 may be utilized to interconnect the servers 216a and 216b. Router 214 may also be connected to gateway 240, which is connected to communications network 230. Router 214 may be connected to one or more load balancers, and alone or in combination may manage communications within networks in data center 210, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 210 shown in FIG. 1, a server manager 215 is also employed to at least in part direct various communications to, from and/or between servers 216a and 216b. While FIG. 1 depicts router 214 positioned between gateway 240 and server manager 215, this is merely an exemplary configuration. In some cases, for example, server manager 215 may be positioned between gateway 240 and router 214. Server manager 215 may, in some cases, examine portions of incoming communications from user computers 202 to determine one or more appropriate servers 216 to receive and/or process the incoming communications. Server manager 215 may determine appropriate servers to receive and/or process the incoming communications based on factors, such as an identity, location or other attributes associated with user computers 202, a nature of a task with which the communications are associated, a priority of a task with which the communications are associated, a duration of a task with which the communications are associated, a size and/or estimated resource usage of a task with which the communications are associated and many other factors. Server manager 215 may, for example, collect or otherwise have access to state information and other information associated with various tasks in order to, for example, assist in managing communications and other operations associated with such tasks.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 210 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
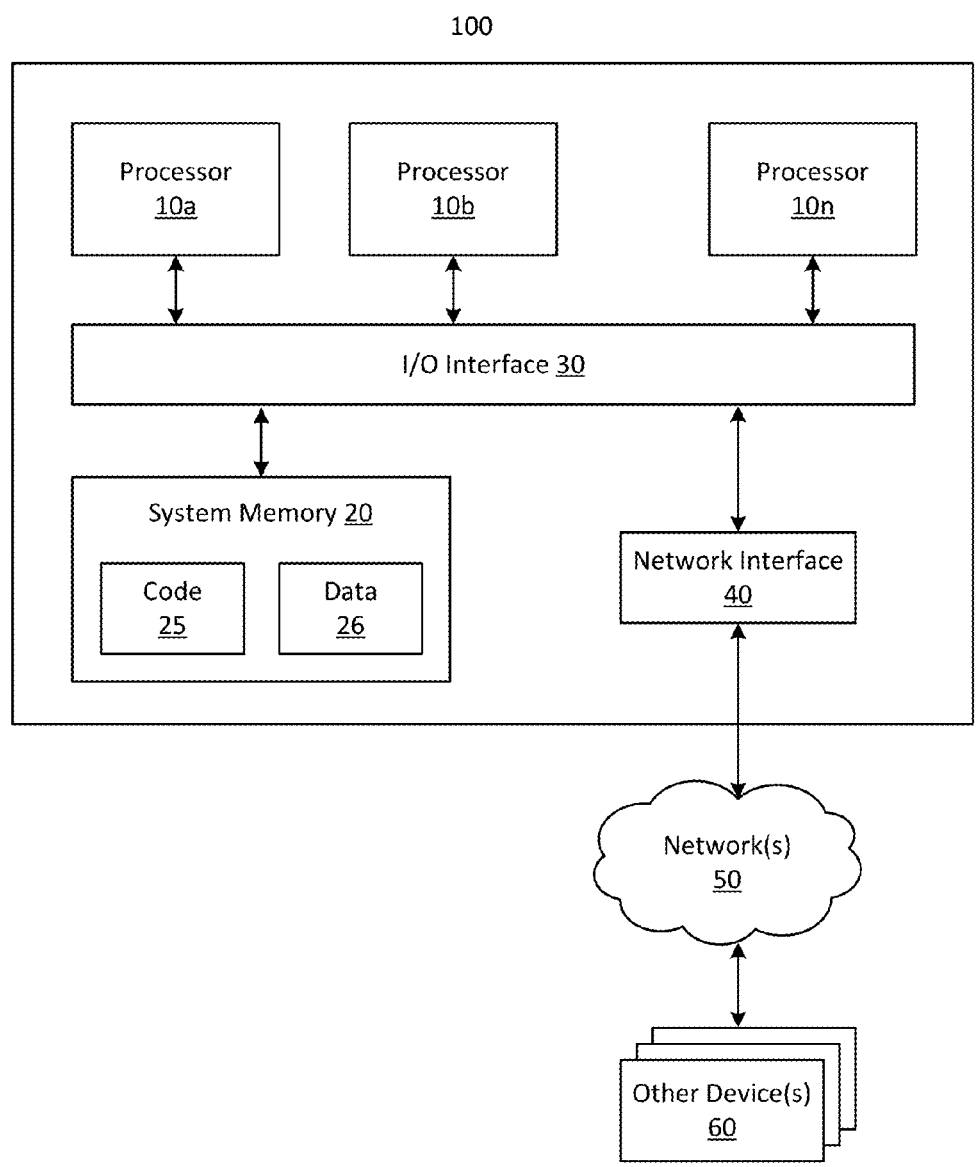
FIG. 2 is a diagram illustrating a second example computing system that may be used in accordance with the present disclosure.

In at least some embodiments, a server that implements a portion or all of one or more of the technologies described herein may include a general-purpose computer system that includes or is configured to access one or more computer-accessible media. FIG. 2 depicts a general-purpose computer system that includes or is configured to access one or more computer-accessible media. In the illustrated embodiment, computing device 100 includes one or more processors 10a, 10b and/or 10n (which may be referred herein singularly as "a processor 10" or in the plural as "the processors 10") coupled to a system memory 20 via an input/output (I/O) interface 30. Computing device 100 further includes a network interface 40 coupled to I/O interface 30.

In various embodiments, computing device 100 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 100 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks, such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 100 via I/O interface 30. A non-transitory computer-accessible storage medium may also include any volatile or non-volatile media, such as RAM (e.g., SDRAM, DDR SDRAM, RDRAM, SRAM, etc.), read only memory (ROM) etc., that may be included in some embodiments of computing device 100 as system memory 20 or another type of memory. Further, a computer-accessible medium may include transmission media or signals, such as electrical, electromagnetic or digital signals conveyed via a communication medium, such as a network and/or a wireless link, such as those that may be implemented via network interface 40. Portions or all of multiple computing devices, such as those illustrated in FIG. 2, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++ and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

As set forth above, information may be provided by an information provider to one or more clients. An information provider may, for example, make available one or more information providing services for providing information to clients. The information providing services may reside on one or more servers. The information providing services may be scalable to meet the demands of one or more customers and may increase or decrease in capability based on the number and type of incoming client requests. Portions of information providing services may also be migrated to be placed in positions of reduced latency with requesting clients. For example, the information provider may determine an "edge" of a system or network associated with information providing services that is physically and/or logically closest to a particular client. The information provider may then, for example, "spin-up," migrate resources or otherwise employ components associated with the determined edge for interacting with the particular client. Such an edge determination process may, in some cases, provide an efficient technique for identifying and employing components that are well-suited to interact with a particular client, and may, in some embodiments, reduce the latency for communications between an information provider and one or more clients.

Figure 3:
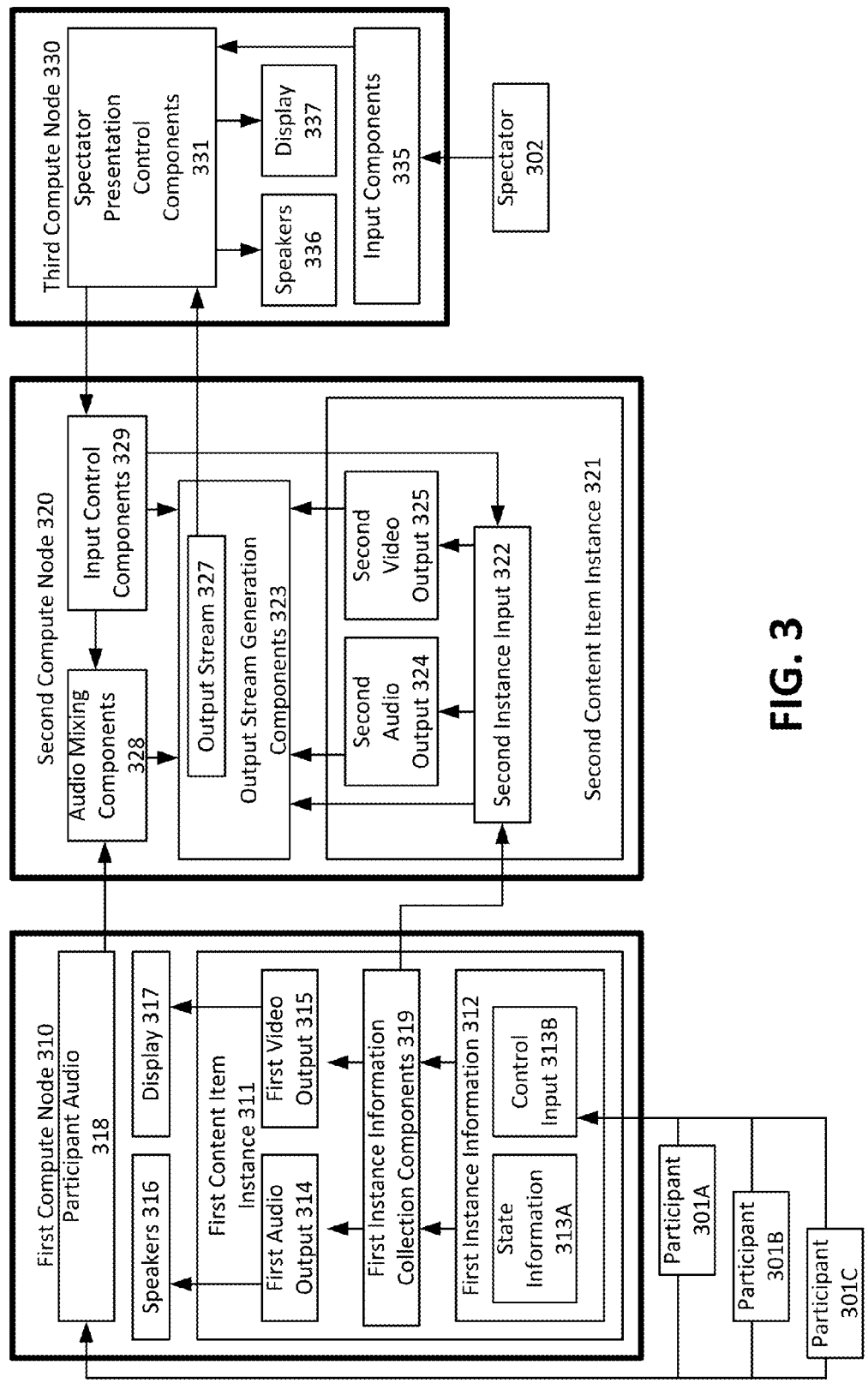
FIG. 3 is a diagram illustrating of an example content presentation system that may be used in accordance with the present disclosure.

As set forth above, techniques for presentation of associated content item instances are disclosed herein. FIG. 3 is a diagram illustrating of an example content presentation system that may be used in accordance with the present disclosure. As shown, FIG. 3 includes a first compute node 310, which executes a first content item instance 311. In some cases, first compute node 310 may be a client compute node and may include a device such as, for example, a video gaming system and/or a desktop, laptop, tablet or mobile computing device. First content item instance 311 may be an instance of a content item such as, for example, a video game. The term content, as used herein, refers to information that is capable of being presented, while the term content item, as used herein, refers to a collection of content. Participants 301A-C communicate with first content item instance 311 to actively control the first content item instance 311. Participants 301A-C may be, for example, players of a video game and each may sometimes control different characters or other entities within the context of the video game. Participants 301A-C may control first content item instance 311 using, for example, controllers, virtual gamepads, mouse, keyboard, audio control, gesture control or any other type of input control. Inputs from participants 301A-C may be provided to first content item instance 311 as control input 313B.

Participants 301A-C may also provide participant audio 318 associated with first content item instance 311. In some cases, each of participants 301A-C may wear a headset with a personal microphone or have access to another type of personal microphone. In some cases, in participant audio 318, participant 301A-C may explain their strategies and reasoning for performing various actions within the context of the first content item instance 311. For example, if first content item instance 311 is a football video game, then the participant audio 318 may sometimes include a particular participant's reasoning for choosing to throw the ball instead of running the ball, for choosing to throw the ball to a particular player, or for selecting a particular type of defense. Also, in some cases, participant audio 318 may include reactions from participants 301A-C to various events within the content of first content item instance 311. For example, when a player scores a touchdown, other competing players may congratulate the scoring player on a successful pass or run or may complain about a missed tackle or a penalty that should have been called.

As also shown in FIG. 3, first content item instance 311 may maintain or otherwise access first instance information 312, which may include, for example, information associated with the first content item instance 311. In the particular example of FIG. 3, first instance information 312 includes state information 313A and control input 313B. As set forth above, in the particular example of FIG. 3, control input 313B includes input from participants 301A-C. Control input 313B may include, for example, information such as movement of characters, weapons, vehicles or other participant-controlled entities. As another example, control input 313B may include selections and options such as skill level, time limits, selected virtual geography, selected characters and opponents, selected weapons, selected plays, story lines, decisions, branches, and the like. State information 313A may include information associated with one or more states of first content item instance 311. State information 313A may include, for example, information associated with timing, locations and positions of characters and other entities, performance data, historical data, option and selection data, scores, achievements, and the like, as well as a record of all, or any portion, of control input 313B.

First content item instance 311 may use first instance information 312 to render and otherwise generate first audio output 314 and first video output 315. As should be appreciated, a number of other components and/or portions of information may also be used to generate first audio output 314 and first video output 315. For example, in some cases, first audio output 314 and first video output 315 may be generated based on underlying code or other information associated with first content item instance 311 as well as various processing components, such as one or more graphics processing units (GPUs) and various audio processing components. First audio output 314 is presented to participants 301A-C using speakers 316, while first video output 315 is presented to participants 301A-C using display 317. It is noted that speakers 316 and display 317 are merely some example output presentation components and any number of other output presentation components may also be employed.

In addition to being used to generate first audio output 314 and first video output 315, first instance information 312 may, in whole or in in part, be collected and provided to second compute node 320 by first instance information collection components 319. First compute node 310 and second compute node 320 may communicate over one or more networks such as the Internet or another wide area network (WAN) a local area network (LAN) or any combinations thereof. In some cases, first instance information 312 may be continually updated and streamed from first compute node 310 to second compute node 320 as first content item instance 312 is executed at first compute node 310. In some cases, second compute node 320 may include one or more server computers. It is also noted that the functionality shown in FIG. 3 as being performed by second compute node 320 may be distributed across any number of different compute nodes, which may each be referred to herein as second compute nodes.

In some cases, first instance information collection components 319 may be included within first content item instance 311 and/or within underlying code or other information associated with first content item instance 311. For example, in some cases, a content item spectating service may advertise itself as offering the abilities to provide content items from participants to spectators using the features disclosed herein, and participants may then download or otherwise obtain content items from such a service and install the content items on their devices. When executed, these content items may, for example, use first instance information collection components 319 to cause a connection to be established to a second compute node 320 and to collect and transmit first content item information 312 to the second compute node 320. In some other examples, first instance information collection components 319 may be components that are external to the first content item instance 311. In such cases, first instance information collection components 319 may also be provided by a content item spectating service such as described above. Also, in some cases, one or more particular first instance information collection components 319 may be capable of collecting and transmitting or otherwise providing first instance information 312 for a variety of different content items such as different video game titles.

As shown in FIG. 3, first instance information 312 is provided to second compute node 320 as second instance input 322 for second content item instance 321. First content item instance 311 and second content item instance 321 may be associated instances of the same or similar content items. For example, in some cases, first content item instance 311 and second content item instance 321 may be separate executing instances of the same video game title. First content item instance 311 and second content item instance 321 may sometimes have access to separate respective copies of versions underlying code or other information associated with a particular content item. There is no requirement, however, that the underlying code or other information available to second content item instance 321 must be identical to the underlying code or other information available to first content item instance 311. For example, in some cases, second content item instance 321 may include content that is at least partially different from first content item instance 311, such as at least partially different scenes, at least partially different graphics, at least partially different audio or at least partially different story arcs. In some cases, first content item instance 311 and second content item instance 321 may execute simultaneously or partially simultaneously with respect to one another. However, there is no requirement that first content item instance 311 and second content item instance 321 must execute simultaneously or partially simultaneously with respect to one another. For example, in some cases, second instance input 322 may be saved at second compute node 320, thereby allowing second content item instance 321 to execute at a later time than first content item instance 311 is executed.

In some cases, the second content item instance 321 may be initiated based on a request from third compute node 330 for output corresponding to a content item with which the first and second content item instances 311 and 321 are associated. For example, a spectator 302 operating the third compute node 330 may wish to have output corresponding to the associated content item presented at the third compute node 330. In some cases, a content item spectating service, such as described above, may cause the second compute node 320 to provide to spectators a list of content items that are available to spectators for spectating. For example, in some cases, second compute node 320 may transmit to third compute node 330 a list of content items that are currently available for spectating. Receiving of the first instance information 312 from first compute node 310 may cause the second compute node 320 to designate the particular content item associated with the first and the second content item instances 311 and 321 as being available for spectating. This, in turn, may cause the associated content item to appear in the list of content items available for spectating provided by the second compute node 320 to the third compute node 330. The third compute node 320 may then request the associated content item, thereby causing the second content item instance 321 to be initiated at the second compute node 320. As should be appreciated, the above described process is merely one example process for initiation of the second content item instance 321 and many other initiation processes for initiation of the second content item instance 321 are contemplated in accordance with the disclosed techniques.

Upon being initiated, second content item instance 321 may render and otherwise generate second audio output 324 and second video output 325 based, at least in part, on second instance input 322. As set forth above, second instance input 322 includes at least part of first instance information 312, which may include, for example, state information 313A and control input 313B and other information associated with first content item instance 311. As should be appreciated, a number of other components and/or portions of information may also be used to generate second audio output 324 and second video output 325. For example, in some cases, second audio output 324 and first video output 325 may be generated based on underlying code or other information associated with second content item instance 321 as well as various processing components, such as one or more graphics processing units (GPUs) and various audio processing components. Additionally, as will be described in detail below, second audio output 324 and second video output 325 may also be generated, for example, based on requests or other input from spectator 302.

Second audio output 324 and/or second video output 325 are provided to output stream generation components 323, which collect audio/or video information associated with a content item to generate output stream 327. In addition to second audio output 324 and second video output 325, output stream 327 may also include all, or any portion of, participant audio data 318 transmitted from first compute node 310 to second compute node 320. As will be described in detail below, participant audio 318 may be mixed into output stream 327 by audio mixing components 328. Output stream 327 may also include all, or any portion, of the second instance input 322, such as input control information and/or state information.

Output stream 327 is transmitted by output stream generation components 323 from second compute node 320 to third compute node 330. Second compute node 320 and third compute node 330 may communicate over one or more networks such as the Internet or another wide area network (WAN) a local area network (LAN) or any combinations thereof. Although not shown in FIG. 3, second compute node 320 and third compute node 330 may include a number of communications components for efficiently communicating over one or more networks, such as one or more encoding and decoding components and/or error correction components. In some cases, third compute node 330 may be a client compute node and may include a device such as, for example, a video gaming system and/or a desktop, laptop, tablet or mobile computing device. As should be appreciated, output stream 327 or any other collection of output data associated with second content item instance 321 may be transmitted to any number of different third compute nodes.

Upon being received by third compute node 330, the information from output stream 327 may be processed by presentation control components 331. The information from output stream 327 may then be presented to spectator 302 using speakers 336 and display 337. It is noted that speakers 316 and display 317 are merely some example output presentation components and any number of other output presentation components may also be employed. As will be described below, spectator 302 or another party may control the presentation of the output stream 317 using, for example, input components 355, which may include for example, a controller, gesture based control, a touchscreen, and a microphone. Input from such input components 355 may be processed by presentation control components 331 and, in some cases, transmitted back to second compute node 320 to assist in controlling generation of output stream 327.

It is noted that, although only a single output stream 327 and a single third compute node 330 are shown in FIG. 3, any number of output streams including identical, different, or partially different information may be transmitted, directly or indirectly, from second compute node 320 to any number of different third compute nodes, which may be operated by any number of different spectators. As an example, in some cases, multiple different spectators may sometimes wish to select different video and/or audio presentation effects, such as different virtual camera perspectives and different directional audio effects. As another example, in some cases, one or more spectators, which are referred to herein as passive spectators, may decide to receive an output stream with the same video and/or audio presentation effects that are selected by one or more other spectators, which are referred to herein as active spectators. In such cases, the output stream that is transmitted to the active spectators (including audio and/or video presentation effects selected by the active spectators) may also be transmitted to the passive spectators. In some cases, the output stream may be delivered directly from the second compute node 320 to both the active spectators and the passive spectators. Also, in some cases, the output stream may be received by the active spectators first and then forwarded from the active spectators to the passive spectators.

It is further noted that the functionality shown in FIG. 3 as being performed by a single first compute node 310 may sometimes be distributed across multiple different compute nodes, which may each be referred to herein as first compute nodes. For example, the functionality performed by first compute node 310 may be distributed across one or more server first compute nodes and one or more client first compute nodes. In some cases, the first content item instance 311 may be played by multiple different participants operating multiple different remote clients. The multiple remote clients may provide user input associated with the first content item instance 311 to a central server, which may sometimes distribute state information updates to the clients. The server may also sometimes render video and/or audio for presentation on the clients. This client-server framework may allow the first content item instance 311 to be played simultaneously on the multiple remote clients. In some cases, one or more server first compute nodes may collect the control input, game state, and other first instance information 312 for the first content item instance 311 and provide the collected first instance information 312 to second compute node 320.

Thus, in some cases, the above described techniques may allow two associated instances (i.e., first content item instance 311 and second content item instance 321) to be generated based, at least in part, on the same or similar information (i.e., first instance information 312). Generation of the two associated content item instances may, for example, allow spectator 301 to experience an associated content item in accordance with input from participants 301A-C without the need to capture and stream high bandwidth-consuming video data from first compute node 310 to second compute node 320. Additionally, generation of the two associated content item instances may also, for example, allow spectator 301 to experience an associated content item using several enhanced presentation effects, which are described in detail below.

Furthermore, it is noted that second compute 320 may sometimes offer a number of enhanced capabilities that may not be available, or may be limited in availability, to first compute node 310. For example, in some cases, second compute 320 may include or have access to multiple graphics processing units (GPUs), while first compute node 310 may have access to only a single GPU. Additionally, in some cases, the GPUs and/or other audio and video processing components available to second compute node 320 may be faster and more sophisticated than those available to first compute node 310. These enhanced capabilities may, in some cases, allow second content item instance 321 to generate second audio output 324 and second video output 325 with higher complexity, more detail, better clarity, better quality, and higher resolution than first audio output 314 and first video output 315 generated by first content item instance 311. This may, for example, allow content to be presented to spectator 301 with higher audio and video quality than in other systems in which spectator 301 views a stream that must be identical to that generated and displayed on a participant device. In some cases, in order to allow for more robust graphics and audio to be generated at second compute node 320, the underlying code available to second content item instance 321 may be slightly different than the underlying code available to first content item instance 311. For example, the underlying code available to second content item instance 321 could include additional graphics data for generating graphics with greater detail and complexity than the underlying code available to first content item instance 311.

Some additional examples of enhanced presentation effects that may, in some cases, be made available using the disclosed techniques to are now described with reference to FIG. 4. In particular, FIG. 4 illustrates a diagram of an example spectator presentation control interface 401. Interface 401 may be executed at third compute node 330 and may be included within or otherwise in communication with spectator presentation control components 331 of FIG. 3. As shown, Interface 401 includes a content display window 410, which may display video output from second content item instance 321. Additionally, interface 401 includes example controls 431-439 for controlling the presentation of second content item instance 321. It is noted that controls 431-439 are merely some examples of enhanced presentation functionality that may be employed in accordance with the disclosed techniques. Specifically, play control 431, pause control 432, stop control 433 and reverse control 434 may allow playing, pausing, stop and reverse, respectively, of the playback of second content item instance 321 at third compute node 330. Furthermore, adjust play speed control 435 may allow the second content item instance 321 to be replayed at adjustable speeds, such as slower and, in some cases, faster than typical speeds.

Adjust camera perspective control 436 may allow spectator 302 to adjust the virtual camera to different positions and/or directions with respect to a particular scene or scenes. For example, in some cases, a scene may initially be presented in interface 401 using the same camera perspective that was used for the corresponding scene in the first content item instance 311. However, interface 401 may allow spectator 302 to subsequently reverse the video feed (e.g., using reverse control 434) and then replay the scene using control 436 to move and/or rotate the camera perspective and capture the same scene from a different position and/or direction than was used for the corresponding scene in the first content item instance 311. For example, consider the scenario in which a virtual camera initially captures a scene from a camera perspective corresponding to a character's eyes (e.g., from a position of the characters eyes in an outward pointing direction) in order to show a scene from the character's point of view. Now suppose that spectator 302 instead prefers to see an expression on the character's face within the scene. Spectator 302 may accomplish this by reversing the scene and adjusting the camera perspective to a position in front from the character and to a direction pointing back towards the character's face.

Figure 5:
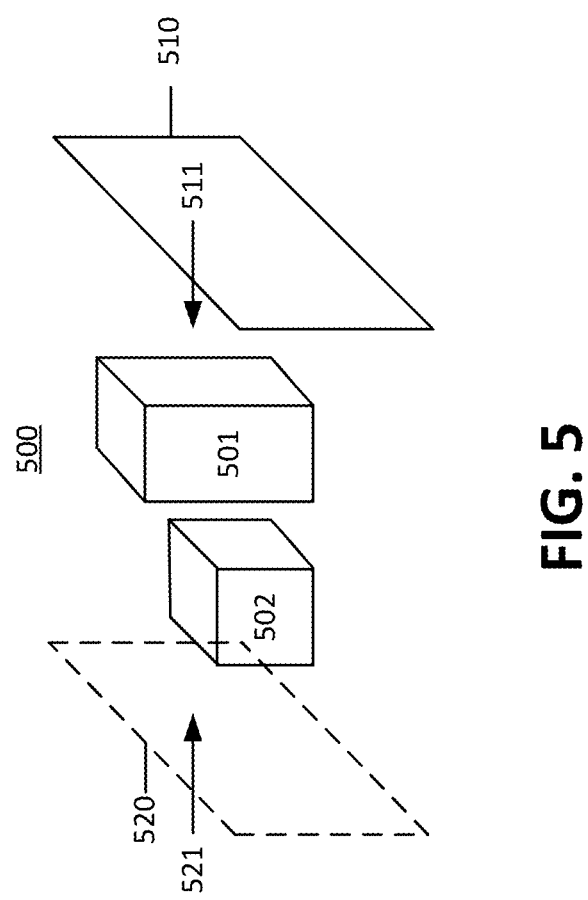
FIG. 5 is a diagram illustrating example camera perspectives that may be used in accordance with the present disclosure.

FIG. 5 depicts an illustration of how different virtual camera perspectives may be used to capture a particular scene. As shown in FIG. 5, scene 500 is a three-dimensional scene that includes three dimensional entities 501 and 502. For purposes of simplicity, entities 501 and 502 are depicted FIG. 5 as having square and rectangular flat surfaces. However, scenes generated in accordance with the present disclosure may include more complex entities such as human characters, vehicles, animals, trees, clouds and many more.

View 510 represents a first view of scene 500 from a first virtual camera perspective with respect to the scene 500. For example, view 510 may represent an image of scene 500 as viewed from particular angles and distances with respect to points in scene 500, such as points on or within entities 501 and 502. Arrow 511 represents a direction of view with respect to view 510, which is facing from view 510 towards a center of scene 500.

View 520 represents a second view of scene 500 from a second virtual camera perspective with respect to the scene 500. For example, view 520 may represent an image of scene 500 as viewed from different particular angles and distances with respect to points in scene 500, such as points on or within entities 501 and 502. Arrow 521 represents a direction of view with respect to view 520, which is facing from view 520 towards a center of scene 500.

As shown in FIG. 5, view 520 is taken from a different camera perspective relative to scene 500 than view 510. Accordingly, view 510 may include and display certain features of scene 500 that are not included or displayed in view 520. For example, view 510 may include a view of the side of entity 501 that faces view 510. By contrast, the side of entity 501 that faces view 510 may not be visible in view 520 because view 520 faces the opposite side of entity 501. Additionally, in view 520, entity 501 may be at least partially obscured by entity 502, which is positioned between view 520 and entity 501. On the other hand, view 520 may include and display certain features of scene 500 that are not included or displayed in view 510. For example, view 520 may include a view of the side of entity 502 that faces view 520. By contrast, the side of entity 502 that faces view 510 may not be visible in view 510 because view 510 faces the opposite side of entity 502. Additionally, in view 510, entity 502 may be at least partially obscured by entity 501, which is positioned between view 510 and entity 502.

Referring back to FIG. 4, adjust zoom control 437 may allow the zoom of the virtual camera capturing the scene to be adjusted, such as by zooming inward and/or zooming outward. For example, a spectator may, in some cases, wish to reverse and replay a scene by zooming inward to provide greater detail on an important portion of the scene or zooming out to capture added graphics and information that may not have been initially presented.

Add audio commentary control 438 may allow spectator 302 or another party to add audio commentary into the presentation of the content item. For example, spectator 302 may wish to comment on certain features of the presentation of the content item, such as by criticizing poor performances by various participants 301A-C, by applauding strong performances by various participants 301A-C, or by explaining what the spectator 302 may have done the same or differently in a similar context. In such cases, third compute node input components 355 of FIG. 3 may include a microphone for receiving the audio commentary. The received audio commentary may, for example, be synchronized and saved with corresponding portions of the presented content item, such that the audio commentary is replayed along with successive replays of the presented content item.

Add visual overlays control 439 may allow spectator 302 or another party to add visual overlay graphics into the presentation of the content item. In some cases, spectator 302 may wish to highlight or otherwise emphasize or indicate certain features of the presentation of the content item using visual overlays. The visual overlays may sometimes be added using, for example, a pen or finger on a touchscreen or other similar technique. As examples, spectator 302 may choose to indicate important areas of a scene, such as areas particularly related to mistakes or successes of performances of the participants 301A-C. The received visual overlays may, for example, be saved and correlated with corresponding areas and portions of the presented content item, such that the visual overlays are displayed along with successive replays of the presented content item.

Figure 6:
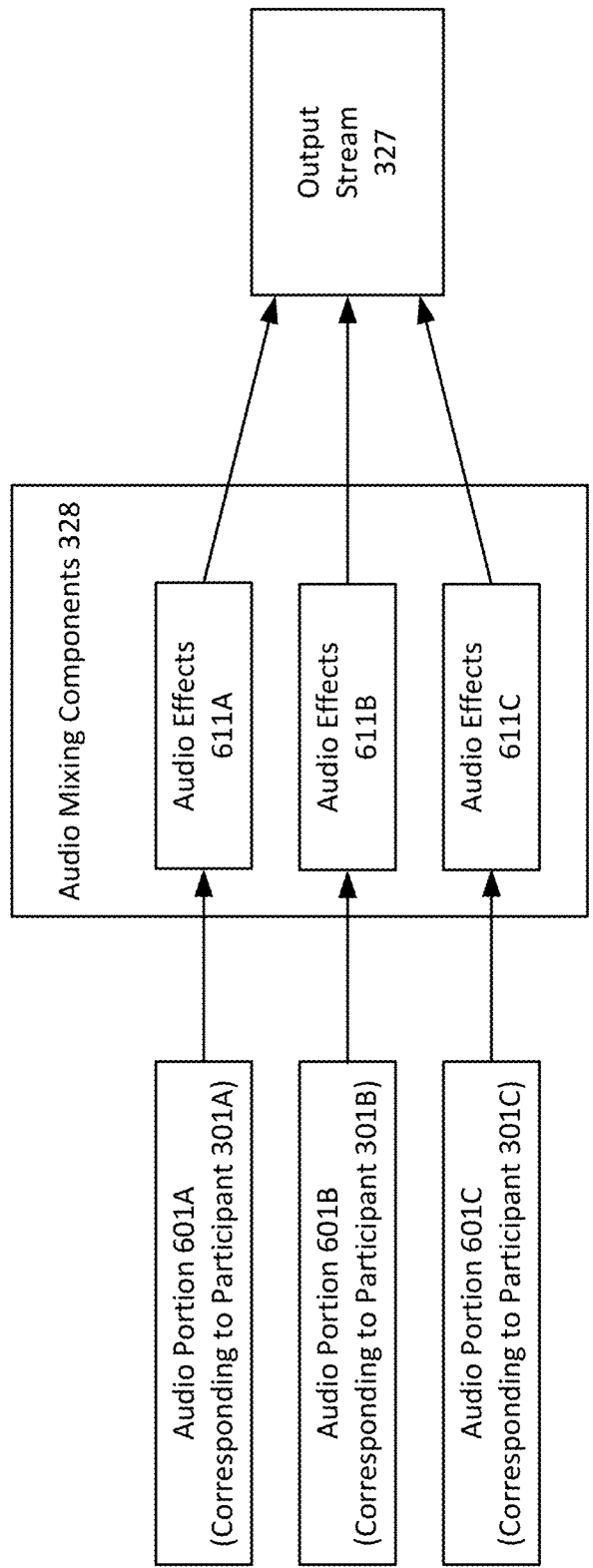
FIG. 6 is a diagram illustrating example audio mixing operations that may be used in accordance with the present disclosure.

As set forth above, second compute node 320 may, in some cases, include components, such as audio mixing components 328 of FIG. 3, for mixing of audio data received from first compute node 310. FIG. 6 is a diagram illustrating example audio mixing operations that may be used in accordance with the present disclosure. In particular, as shown in FIG. 6, audio mixing component 328 receives audio portion 601A corresponding to participant 301A, audio portion 601B corresponding to participant 301B, and audio portion 601C corresponding to participant 301C. As was shown in FIG. 3, for example, first component 310 may receive participant audio 318, which may include portions such as audio portions 610A-C. First component 310 may then transmit the received participant audio 318 to audio mixing component 328 at second compute node 320.

As also set forth above, in some cases, each of participants 301A-C may wear a headset with a personal microphone or have access to another type of personal microphone. These personal microphones may sometimes be advantageous because they may generally improve audio quality by providing microphones that are at close range to each of the different participants 301A-C, regardless of where each participant 301A-C is sitting in a particular room. However, while these personal microphones may sometimes serve to improve general audio quality, they may sometimes make it difficult for a listener to determine which words are being spoken by which of the multiple participants 301A-C. This is because the audio portions provided by each of the participants 301A-C from personal microphones may sometimes include minimal directional or locational characteristics. For example, a participant sitting in a corner of the room and speaking into a personal microphone may sound very similar to another participant sitting in the center of the room and speaking into a personal microphone.

Audio mixing components 328 may sometimes apply certain audio effects 611A-C to audio portions 601A-C. In particular, audio mixing components 328 apply audio effects 611A to audio portion 601A, audio effects 611B to audio portion 601B, and audio effects 611C to audio portion 601C. The audio effects 611A-C may include, for example, certain directional effects. In one example, audio effects 611A may include effects that cause audio portion 601A to be played out of a right speaker, audio effects 611B may include effects that cause audio portion 601B to be played out of a center speaker, and audio effects 611C may include effects that cause audio portion 601C to be played out of a left speaker. As another example, audio effects 611A-C may include certain volume levels that may be assigned to each of audio portions 601A-C in order to, for example, create perceptions of distances and/or depths. Any number of other additional audio effects may also be applied. It is noted that, in some cases, audio effects may be applied to less than all input streams. Also, in some cases, particular audio effects may be applied to multiple input streams. These applied audio effects may sometimes help listeners, such as spectator 302, to better distinguish between different speakers, such as participants 301A-C. It is further noted that, in addition to helping listeners to better distinguish between different speakers, audio effects may also be applied to audio portion for any other desired reasons.

Figure 7:
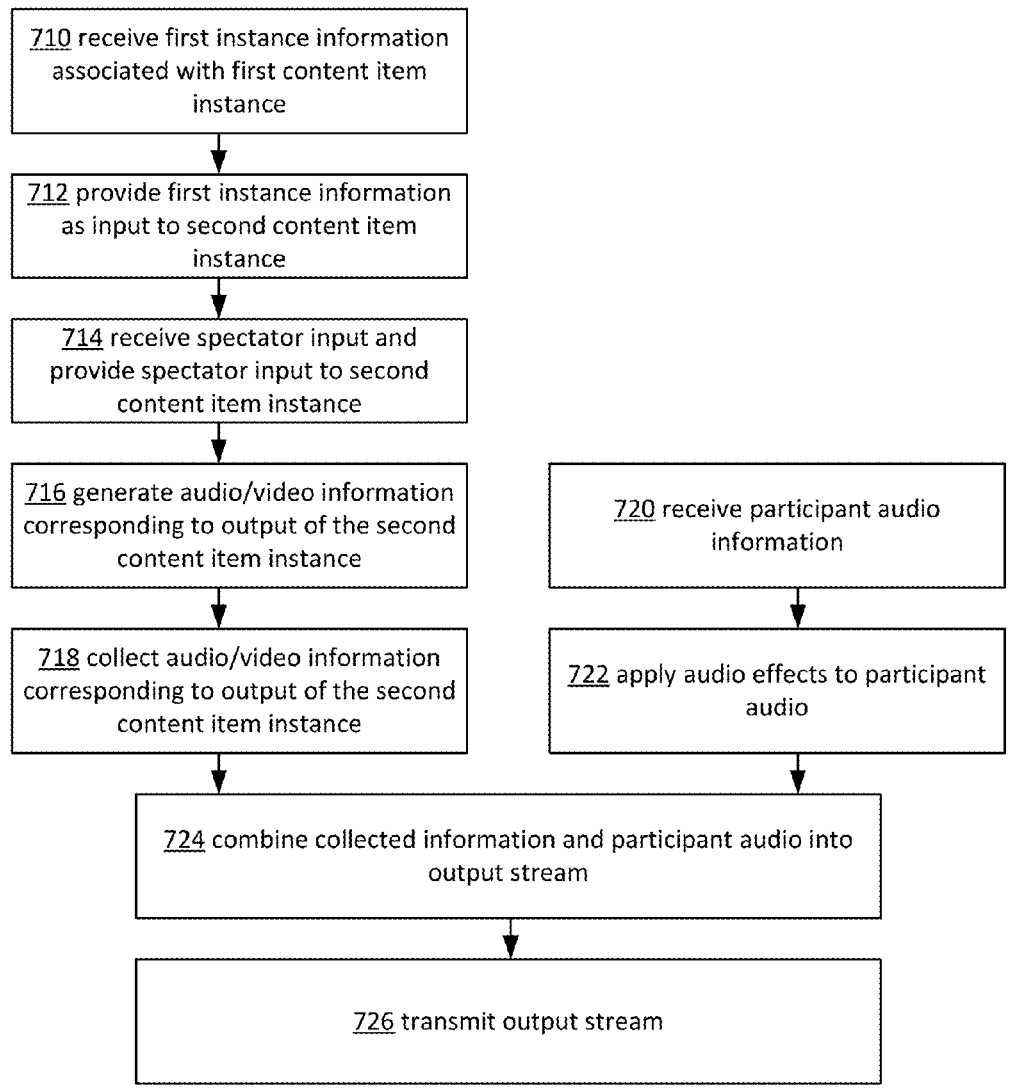
FIG. 7 is a flowchart depicting an example content providing process that may be used in accordance with the present disclosure.

Some example techniques for providing content in accordance with the disclosed techniques will now be described in detail. In particular, FIG. 7 is a flowchart depicting an example content providing process that may be used in accordance with the present disclosure. As shown in FIG. 7, at operation 710, first instance information is received. As set forth above, the first instance information is information associated with a first content item instance, which may be executed at one or more first compute nodes. The first content item instance may be played by, and presented to, one or more participants that actively control the playing of the first content item instance. The first instance information may include, for example, control input from participants as well as state information associated with the first content item instance. As also set forth above, the first instance information may be received by one or more second compute nodes after being collected by one or more first compute nodes and transmitted to the one or more second compute nodes using, for example, one or more networks such as the Internet.

At operation 712, the received first instance information, or any portion thereof, is provided as input to a second content item instance. As set forth above, the second content item instance may execute at the one or more second compute nodes. The second content item instance and the first content item may, for example, be instances of the same video game title or other content item title. As also set forth above, however, some differences may exist between various features of the first content item instance and the second content item instance. In some cases, the second content item instance may execute simultaneously or partially simultaneously with the first content item instance, but there is no requirement that the first and second content item instances execute simultaneously or partially simultaneously with one another. In some cases, the second content item instance may be initiated based on, for example, a request from a spectator to be presented with a spectator version of a content item with which the first and second content item instances are associated.

At operation 714, spectator input is received and provided as input to the second content item instance. The spectator input may be received from one or more third compute nodes and may be provided by one or more spectators. The spectator input refers to information associated with requested characteristics of audio and/or video information for presentation. The spectator input may include, for example, playback control input (e.g., play, pause, stop, reverse), play speed adjustment input, virtual camera perspective adjustment input, virtual camera zoom adjustment input, added audio commentary information, added visual overlay information, resolution information, and other spectator input information. Some examples of spectator input information and how such information may be applied and used to present content are described in detail above, such as with respect to FIGS. 4 and 5, and are not repeated here. It is noted, however, that spectator input information may sometimes cause portions of audio and/or video information to be presented to spectators with characteristics that differ from those associated with respective portions of the first content item instance presented to participants at one or more first compute nodes. For example, scenes may be sometimes be presented to spectators with different virtual camera perspective than those used for respective scenes presented to participants in the first content item instance.

At operation 716, audio and/or video information corresponding to the output of the second content item instance is generated. For example, the second content item instance may sometimes use participant control input and state information from the first content item instance to generate a particular scene. The second content item instance may then use virtual camera perspective information provided by the spectator to determine characteristics such as a position, direction, and angle of the virtual camera with respect to the generated scene. The generated scene and virtual camera perspective information may then be used to generate an image of the scene or a portion of an image of the scene. At operation 718, the generated audio and video information, or any portion thereof, is collected.

At operation 720, participant audio information is received. As set forth above, the participant audio may be received by, for example, one or more second compute nodes after being collected and transmitted by one or more first compute nodes using, for example, one or more networks, such as the Internet. The received participant audio information may correspond to, for example, commentary from the participants describing their activity within the first content item instance, such as performance, strategy, criticism or praise of themselves and/or other participants, and the like. As also set forth above, the participant audio information may sometimes be collected using headsets or other personal microphone devices that may be positioned in close proximity to each respective participant.

At operation 722, one or more audio effects are applied to the participant audio information. For example, as set forth above, the participant audio information may include a number of portions each associated with a respective participant. Each portion, may, for example, be captured from a headset or personal microphone associated with a respective participant. As also set forth above, in some cases, one or more audio effects may be applied to each portion of the participant audio information. For example, audio associated with each spectator could be assigned to a respective speaker (or other assigned directional effect) or may be assigned a respective volume level or other audio effect. Such effects may sometimes make it easier for a listener to determine which portions of the participant audio are provided by which participants.

At operation 724, the collected audio and video data corresponding to the output of the second content item instance and the participant audio are combined into an output stream, and, at operation 726, the output stream is transmitted. As set forth above, the output stream may be transmitted to one or more third compute nodes for presentation to one or more spectators. As should be appreciated, the example process shown in FIG. 7, or any portions thereof, may be repeated as necessary for various scene or other portions of the first and/or second content item instances.

Some example techniques for providing spectator feedback to one or more instances of a content item will now be described in detail. In particular, in some cases, it may be desirable for spectators to provide feedback to an instance of a content item that is in the progress of being played by one or more participants. For example, one or more video game spectators may provide feedback to one or more participants that are playing the video game. Such spectator feedback may include, for example, information associated with events, objects, characters, or any other entities within the context of the content item. For example, in some cases, spectator feedback may request that one or more characters, optionally controlled by one or more participants, be added to a game or portion of a game, removed from a game or portion of a game, or modified in some manner, such as being granted, or having removed, various skills, powers, tools, weapons, first aid and medical supplies, finances, resources, knowledge, affiliations, memberships, and the like. In one specific example, spectator feedback may be a request to make one or more objects available to one or more characters or a request to restrict availability of one or more objects to one or more characters. In addition to characters, spectator feedback may also request additions, removals, and/or modifications of one or more objects within a content item or portion of a content item. For example, spectators may request that a particular type of vehicle, weapon, animal, building, or other object be added, removed, and/or modified with respect to a content item or portion of a content item. Also, in some examples, spectator feedback may include requests for one or more events to occur, not occur, be paused, stopped, rescheduled, or be modified in some manner. For example, spectators may request a fight or other confrontation between one or more characters. Spectators may also, for example, request that a fight be extended from five minutes to ten minutes or from two rounds to four rounds. As another example, spectators may request to initiate, terminate or modify acts of nature such as thunder, lightning, rain, snow, hurricanes, tornadoes, waves, typhoons, and the like.

In some examples, spectator feedback may include one or more votes from one or more spectators in relation to certain features of a content item. For example, spectators may vote to decide which characters have won and/or lost a fight or other confrontation. Spectators may vote to predict which characters will win and/or lose a fight or other confrontation. As another example, spectators may vote to decide whether a character should live or die, should advance to a higher level, be demoted to a lower level, earn a reward, be stripped of a reward, and the like. Spectators may also vote to attempt to predict an outcome of any of the above or other events. Also, in some examples, spectators may wager on the outcomes of one or more events or occurrences within a content item. For example, spectators may wager as to which characters may win or lose a fight or a poker match. In some cases, odds associated with particular available wager selections may be generated and displayed, such as odds that one or more characters will win or lose a fight. The odds may be based on, for example, performance of the participants controlling the characters and/or attributes of the characters themselves, such as strength, weapons, intelligence, and the like. In some cases, if a particular character receives favorable feedback, such as high amounts of wagers predicting that the particular character will win a fight, then the particular character may be provided with additional weapons or resources. By contrast, if a particular character receives negative feedback, such as high amounts of wagers predicting that the particular character will lose a fight, then the particular character may be stripped of certain weapons or resources.

In some cases, a name or other identifier associated with one or more spectators that request feedback may be associated with the feedback and displayed or otherwise indicated when the feedback is applied to a content item. For example, in some cases, names of voters and/or betters may be displayed adjacent to a particular vote count or bet count. As another example, a particular color lightning bolt could indicate that a storm is requested by a particular spectator. In some examples, even when indication of spectator identities is available, some spectators may still request that their identities remain anonymous in some or all cases.

In some cases, spectator feedback may be made universally available to all spectators. By contrast, in some cases, all, or certain types, of spectator feedback may only be made available to certain spectators, such as spectators that pay a fee, have a membership, or are considered expert players. As another example, in some cases, different fees or costs may be associated with rights to provide different types of feedback. Also, in some cases, one or more spectators may be provided with an option to select and/or de-select types of spectator feedback that are available to be provided by one or more other spectators. For example, as set forth above, in some cases, one or more spectators, which are referred to herein as passive spectators, may decide to receive an output stream with the same video and/or audio presentation effects that are selected by one or more other spectators, which are referred to herein as active spectators. In some cases, one or more active spectators may have the ability to control which types of spectator feedback may be provided by one or more passive spectators. For example, in some cases, only active spectators may be permitted to request a poll, or pose a question for spectator vote or set up spectator wagering within the context of the content item, while, in other cases, any spectator may be permitted to do so. As another example, in some cases, all votes by passive spectators may be attributed to a corresponding active spectator.

Figure 8:
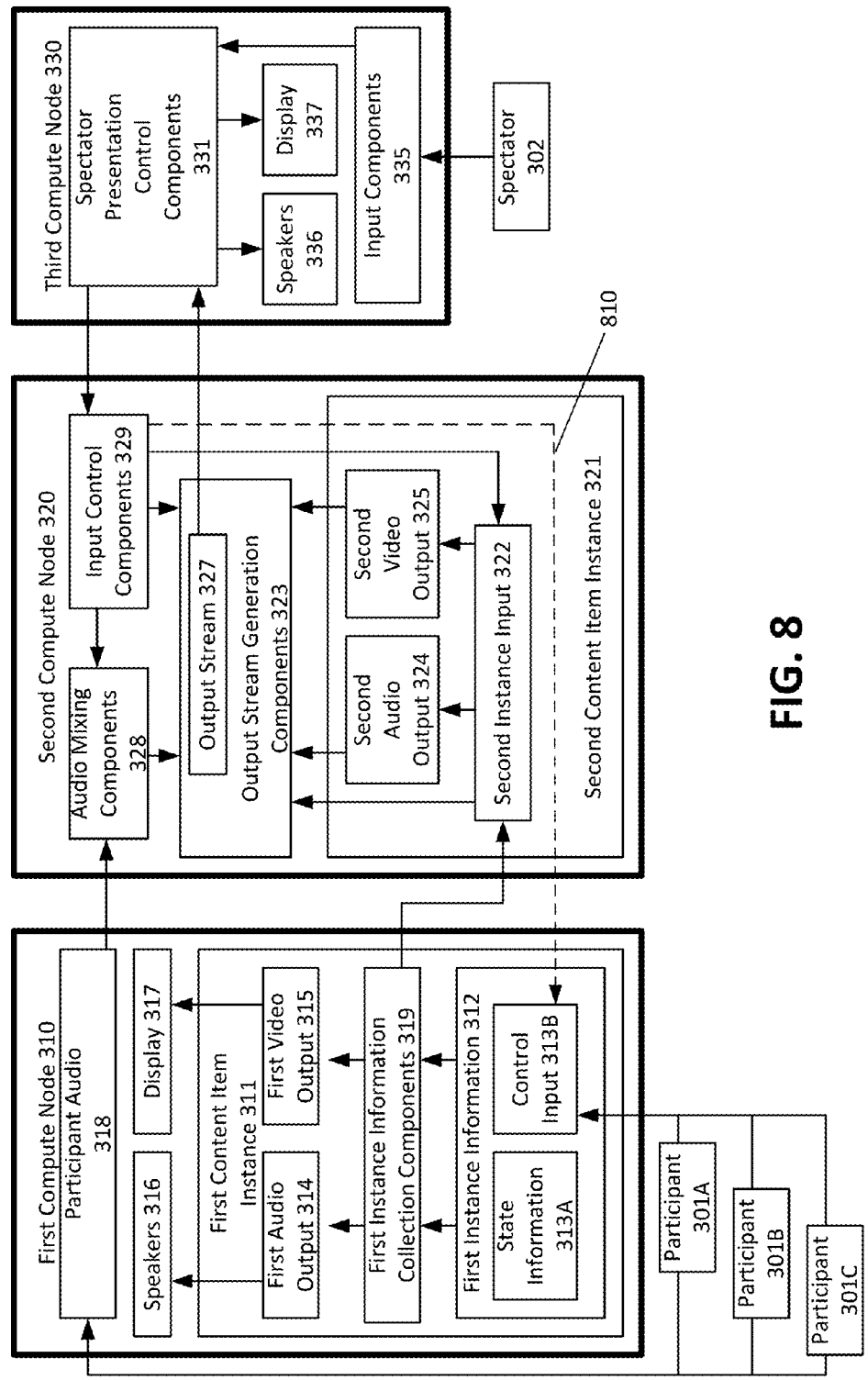
FIG. 8 is a diagram illustrating of an example content presentation system with spectator feedback that may be used in accordance with the present disclosure.

FIG. 8 is a diagram illustrating an example content presentation system with spectator feedback that may be used in accordance with the present disclosure. The example system shown in FIG. 8 is identical to the example system shown in FIG. 3 and described in detail above, with the exception that the example system shown in FIG. 8 includes a backchannel 810 (represented by a dashed line in FIG. 8) from input control components 329 of second compute node 320 to control input 313B received by first compute node 310. In particular, the backchannel 810 may be used to provide spectator feedback, or any portions thereof, as input to the first content item instance 311. As should be appreciated, the spectator feedback may be provided by one or more spectators 302 and transmitted from one or more third compute nodes 330 to input control components 329 of second compute node 320. Second compute node 320 may, in some cases, process the spectator feedback, such as by compiling or coordinating related feedback from different spectators, before forwarding the feedback to the first content item instance 311. Providing of the spectator feedback to first content item instance 311 may allow the first content item instance 311 to be presented to based, at least in part, on at least a portion of the spectator feedback, such as in any of the example manners described above or others. It is noted that, in some cases, providing of spectator feedback to first content item instance 311 may also result in the spectator feedback being reflected in the second instance input 322 collected from the first content item instance 311, and, therefore, being reflected in the second audio and video outputs 324 and 325. Nevertheless, in some cases, spectator feedback may also be provided from input control components 329 to second content item instance 321 via second instance input 322.

It is noted that the example system of FIG. 8 depicts what may sometimes be referred to as a mirroring or partial-mirroring scenario, in which the second content item instance 321 may sometimes mirror or partially mirror the output of the first content item instance 311. As should be appreciated, however, the spectator feedback techniques described herein are not necessarily limited to mirroring or partial-mirroring scenarios and may sometimes be employed in non-mirroring scenarios, such as in cases video and audio output of the first content item instance 311 are provided to spectators 302 and there is no corresponding second content item instance. In these non-mirroring scenarios, spectator feedback may, for example, be provided from spectators to the first content item instance via components such as input control components 329.

Figure 9:
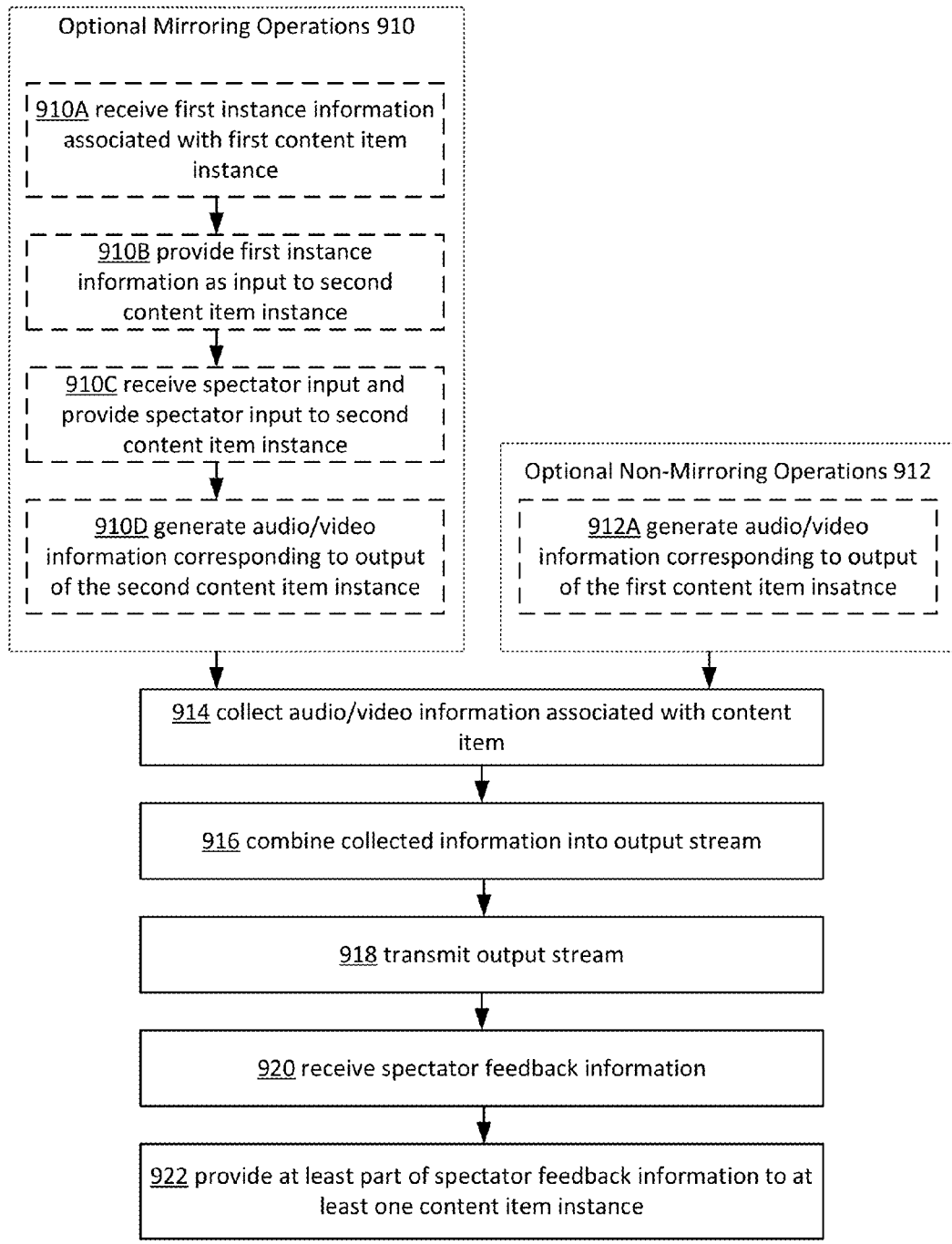
FIG. 9 is a flowchart depicting an example content providing process with spectator feedback that may be used in accordance with the present disclosure.

FIG. 9 is a flowchart depicting an example content providing process with spectator feedback that may be used in accordance with the present disclosure. In particular, FIG. 9 shows two different optional scenarios that may be performed depending upon whether mirroring or partial-mirroring techniques are employed (e.g., as shown in FIG. 8) or whether non-mirroring techniques are employed (e.g., with no second content item instance being employed). Specifically, optional mirroring operations 910 include example operations 910A-D, which may be employed in a mirroring or partial-mirroring approach. Additionally, optional non-mirroring operations 912 include example operation 912A, which may be employed in a non-mirroring approach. It is noted that operations 910A-D are identical to operations 710-718 of FIG. 7 and, therefore, a description of these operations will not be repeated here. In general, it is noted that operations 910 allow audio and video information corresponding to a second content item instance, such as second content item instance 321 of FIG. 8, to be generated for transmission to spectators. As noted above, the second content item instance 321 may sometimes mirror or partially mirror the output of the first content item instance 311. By contrast, operation 912A allows audio and/or video information corresponding to a first content item instance to be generated (e.g., without use of a mirrored or partially-mirrored second content item instance).

At operation 914, audio and video information associated with a content item are collected. In particular, when mirroring or partial-mirroring techniques are employed, the audio and video information collected at operation 914 may include audio and video information corresponding to the second content item instance generated at operation 910D. By contrast, in cases when non-mirroring techniques are employed, the audio and video information collected at operation 914 may include audio and video information corresponding to the first content item instance generated at operation 912A. At operation 916, the collected audio and video data are combined into an output stream, and, at operation 918, the output stream is transmitted. As set forth above, the output stream may be transmitted to one or more third compute nodes, which may also be referred to as spectator compute nodes, for presentation to one or more spectators. At operation 918, spectator feedback information may be received from one or more spectator compute nodes, including, for example, any of the example spectator feedback information described above or other spectator feedback information. At operation 920, at least part of the spectator feedback information is provided to at least one content item instance. In the mirroring or partial-mirroring scenario, in some examples, spectator feedback information may be provided to the first content item instance and optionally to the second content item instance. In the non-mirroring scenario, spectator feedback information may be provided to the first content item instance. In either scenario, the first content item instance may be presented to at least one participant user based, at least in part, on the information associated with spectator feedback. For example, the information associated with spectator feedback may sometimes be used to at least partially control generation of audio, video, and/or other data by the first content item instance. Many example types of spectator feedback are described in detail above and are not repeated here. However, it is noted that any of the examples of spectator feedback described above, or other types of spectator feedback, may, for example, be processed as control input by the first content item instance to generate resulting audio, video, or other output data for presentation. Furthermore, in some examples, spectator feedback may also be provided as input to one or more additional applications associated with the first content item instance. In one particular example, spectator feedback may include a request by one or more spectators to provide money or other currency to a particular participant's banking account or other financial application. In yet another example, a spectator may request that audio and/or video content be provided to a media playing application accessible to one or more participants.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for providing content comprising:
  receiving, from one or more first compute nodes, information associated with a first content item instance;
  providing the information associated with the first content item instance as input to a second content item instance executed by one or more second compute nodes;
  collecting at least one of audio or video information corresponding to output of the second content item instance; and
  transmitting data including the at least one of audio or video information to one or more third compute nodes for presentation, wherein input is received that indicates at least one of visual overlay information or audio commentary information associated with at least a portion of the transmitted data, and wherein the at least portion of the transmitted data is presented in combination with the at least one of visual overlay information or audio commentary information.

2. The computer-implemented method of claim 1, wherein the information associated with the first content item instance comprises at least one of control input associated with the first content item instance or state information associated with the first content item instance.

3. The computer-implemented method of claim 1, further comprising:
  receiving, from the one or more first compute nodes, participant audio information provided by one or more participants of the first content item instance; and
  inserting the participant audio information into the transmitted data.

4. The computer-implemented method of claim 3, wherein the participant audio information includes a plurality of portions each provided by a respective participant of a plurality of participants of the first content item instance, and wherein each portion of the plurality of portions is inserted into the transmitted data in accordance with one or more respective audio effects.

5. The computer-implemented method of claim 1, wherein the first content item instance captures a first scene from a first virtual camera perspective with respect to the first scene, and wherein the second content item instance captures the first scene from a second virtual camera perspective with respect to the first scene, wherein the second virtual camera perspective is at least partially different from the first virtual camera perspective.

6. The computer-implemented method of claim 1, wherein the transmitted data is received by a plurality of third compute nodes, and wherein at least one of the plurality of third compute nodes selects at least one of video or audio presentation effects that are used to present the transmitted data on at least one other of the plurality of third compute nodes.

7. The computer-implemented method of claim 1, wherein the transmitted data comprises video information that is presented at the one or more third compute nodes with a different resolution than a resolution at which the first content item instance is presented.

8. The computer-implemented method of claim 1, wherein the transmitted data comprises graphics with at least one of higher complexity or greater detail than graphics provided by the first content item instance.

9. One or more non-transitory computer-readable storage media having stored thereon instructions that, upon execution by one or more second compute nodes, cause the one or more second compute nodes to perform operations comprising:
  receiving, from one or more first compute nodes, information associated with a first content item instance;
  providing the information associated with the first content item instance as input to a second content item instance executed by the one or more second compute nodes;
  collecting at least one of audio or video information corresponding to output of the second content item instance; and
  transmitting data including the at least one of audio or video information to one or more third compute nodes for presentation, wherein input is received that indicates at least one of visual overlay information or audio commentary information associated with at least a portion of the transmitted data, and wherein the at least portion of the transmitted data is presented in combination with the at least one of visual overlay information or audio commentary information.

10. The one or more non-transitory computer-readable storage media of claim 9, wherein the information associated with the first content item instance comprises at least one of control input associated with the first content item instance or state information associated with the first content item instance.

11. The one or more non-transitory computer-readable storage media of claim 9, further the operations further comprise:
  receiving, from the one or more first compute nodes, participant audio information provided by one or more participants of the first content item instance; and
  inserting the participant audio information into the transmitted data.

12. The one or more non-transitory computer-readable storage media of claim 11, wherein the participant audio information includes a plurality of portions each provided by a respective participant of a plurality of participants of the first content item instance, and wherein each portion of the plurality of portions is inserted into the transmitted data in accordance with one or more respective audio effects.

13. The one or more non-transitory computer-readable storage media of claim 9 wherein the first content item instance captures a first scene from a first virtual camera perspective with respect to the first scene, and wherein the second content item instance captures the first scene from a second virtual camera perspective with respect to the first scene, wherein the second virtual camera perspective is at least partially different from the first virtual camera perspective.

14. The one or more non-transitory computer-readable storage media of claim 9, wherein the transmitted data is received by a plurality of third compute nodes, and wherein at least one of the plurality of third compute nodes selects at least one of video or audio presentation effects that are used to present the transmitted data on at least one other of the plurality of third compute nodes.

15. The one or more non-transitory computer-readable storage media of claim 9, wherein the transmitted data comprises video information that is presented at the one or more third compute nodes with a different resolution than a resolution at which the first content item instance is presented.

16. The one or more non-transitory computer-readable storage media of claim 9, wherein the transmitted data comprises graphics with at least one of higher complexity or greater detail than graphics provided by the first content item instance.

17. A system comprising:
  one or more processors
  one or more memories to store a set of instructions, which if executed by the one or more processors, causes the one or more processors to perform operations comprising:
    receiving, from one or more first compute nodes, information associated with a first content item instance;
    providing the information associated with the first content item instance as input to a second content item instance executed by one or more second compute nodes;
    collecting at least one of audio or video information corresponding to output of the second content item instance; and
    transmitting data including the at least one of audio or video information to one or more third compute nodes for presentation, wherein input is received that indicates at least one of visual overlay information or audio commentary information associated with at least a portion of the transmitted data, and wherein the at least portion of the transmitted data is presented in combination with the at least one of visual overlay information or audio commentary information.

18. The system of claim 17, wherein the information associated with the first content item instance comprises at least one of control input associated with the first content item instance or state information associated with the first content item instance.

19. The system of claim 17, wherein the operations further comprise:
  receiving, from the one or more first compute nodes, participant audio information provided by one or more participants of the first content item instance; and
  inserting the participant audio information into the transmitted data.

20. The system of claim 19, wherein the participant audio information includes a plurality of portions each provided by a respective participant of a plurality of participants of the first content item instance, and wherein each portion of the plurality of portions is inserted into the transmitted data in accordance with one or more respective audio effects.

21. The system of claim 17, wherein the first content item instance captures a first scene from a first virtual camera perspective with respect to the first scene, and wherein the second content item instance captures the first scene from a second virtual camera perspective with respect to the first scene, wherein the second virtual camera perspective is at least partially different from the first virtual camera perspective.

22. The system of claim 17, wherein the transmitted data is received by a plurality of third compute nodes, and wherein at least one of the plurality of third compute nodes selects at least one of video or audio presentation effects that are used to present the transmitted data on at least one other of the plurality of third compute nodes.

\* \* \* \* \*